United States Patent [19] [11] 3,881,865
Greenhalgh et al. [45] May 6, 1975

[54] ANTHRAQUINONE DYESTUFF MIXTURES
[75] Inventors: Colin William Greenhalgh; David Francis Newton, both of Manchester, England
[73] Assignee: Imperial Chemical Industries Limited, London, England
[22] Filed: Apr. 26, 1973
[21] Appl. No.: 354,913

[30] Foreign Application Priority Data
June 2, 1972 United Kingdom............. 25859/72

[52] U.S. Cl.................... 8/25; 8/39 C; 260/376; 260/378; 260/379; 260/380
[51] Int. Cl............. C09b ; D06p 1/00; D06p 3/00; D06p 5/00; D06p 7/00
[58] Field of Search............ 8/25, 39 C, 39 R, 39 A, 8/39 B, 39 D; 260/378, 380, 376, 379

[56] References Cited
UNITED STATES PATENTS

| | | | |
|---|---|---|---|
| 2,060,186 | 11/1936 | Felix et al. | 8/25 |
| 2,342,191 | 2/1944 | Grossmann | 8/25 |
| 2,506,020 | 5/1950 | Grossmann et al. | 8/25 |
| 2,766,262 | 10/1956 | Belshaw | 8/25 |
| 2,894,800 | 7/1959 | Guenthard et al. | 8/25 |
| 3,097,909 | 7/1963 | Rhyner et al. | 8/25 |
| 3,164,449 | 1/1965 | Buxbaum et al. | 8/25 |
| 3,707,346 | 12/1972 | Markert et al. | 8/25 |
| 3,734,934 | 5/1973 | Kolliker et al. | 8/39 C |
| 3,767,682 | 10/1973 | Harvey | 8/39 R |

FOREIGN PATENTS OR APPLICATIONS

| | | | |
|---|---|---|---|
| 2,029,793 | 1/1971 | Germany | 3/25 |
| 7,007,009 | 10/1970 | Japan | 8/39 |

Primary Examiner—Benjamin R. Padgett
Assistant Examiner—T. S. Cron
Attorney, Agent, or Firm—Cushman, Darby & Cushman

[57] ABSTRACT
Dyestuff compositions which comprise
a. from 65 to 95 percent by weight (based on the total weight of dyestuffs in the mixture) of a disperse anthraquinone dyestuff of the formula

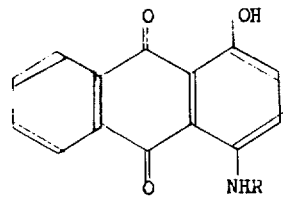

which can contain up to 30 percent of its own weight of a disperse anthraquinone dyestuff of the formula

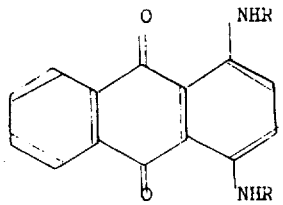

wherein R represents a phenyl radial which can be substituted by one or more chlorine or bromine atoms or by hydroxy, amino, lower alkyl, lower alkoxy, hydroxyloweralkoxy, N-lower alkylamino, N:N-di(lower alkyl)amino, carbo lower alkoxy, lower alkoxycarbonyloxy or lower alkylcarbonyloxy groups;

b. from 5 to 35 percent by weight (based on the total weight of dyestuffs present in the mixture) of one or more disperse anthraquinone dyestuffs of the formula:

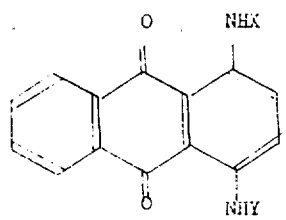

wherein X and Y each independently represent a lower alkyl, hydroxy lower alkyl or lower alkoxy lower radical, and c. from 0 to 15 percent by weight (based on the total weight of dyestuffs present in the mixture) of at least one yellow to red disperse dyestuff, and their use for colouring aromatic polyester textile materials.

2 Claims, No Drawings

ANTHRAQUINONE DYESTUFF MIXTURES

This invention relates to mixtures of disperse anthraquinone dyestuffs which are valuable for colouring aromatic polyester textile materials.

According to the invention there are provided mixtures of disperse anthraquinone dyestuffs which comprise a. from 65 to 95 percent by weight (based on the total weight of dyestuffs in the mixture) of a disperse anthraquinone dyestuff of the formula

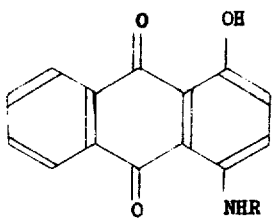

Formula I which can contain up to 30 percent of its own weight of a disperse anthraquinone dyestuff of the formula

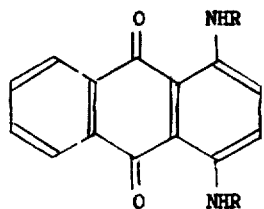

Formula II wherein R represents a phenyl radical which can be substituted by one or more chlorine or bromine atoms or by hydroxy, amino, lower alkyl, lower alkoxy, hydroxyloweralkoxy, N-lower alkylamino, N:N-di(lower alkyl)amino, carbo lower alkoxy, lower alkoxycarbonyloxy or lower alkylcarbonyloxy groups;

b. from 5 to 35 percent by weight (based on the total weight of dyestuffs present in the mixture) of one or more disperse anthraquinone dyestuffs of the formula:

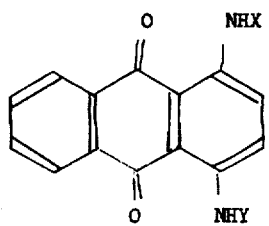

Formula III wherein X and Y each independently represent a lower alkyl, hydroxy lower alkyl or lower alkoxy lower alkyl radical, and c. from 0 to 15 percent by weight (based on the total weight of dyestuffs present in the mixture) of at least one yellow to red disperse dyestuff.

Throughout this specification the terms "lower alkyl" and "lower alkoxy" are used to denote alkyl and alkoxy radicals respectively containing from 1 to 6 carbon atoms.

As examples of the groups which may be present as substituents on the phenyl radical represented by R there may be mentioned methyl, ethyl, methoxy, ethoxy, β-hydroxyethoxy, propoxy, butoxy, methylamino, dimethylamino, diethylamino, carbomethoxy, carboethoxy, methoxycarbonyloxy, acetyloxy and propionyloxy.

As examples of the radicals represented by X and Y there may be mentioned methyl, ethyl, n-propyl, n-butyl, isopropyl, β-hydroxyethyl, β- or γ-hydroxypropyl, β-(methoxy or ethoxy)ethyl, n-hexyl, γ-methoxypropyl, dihydroxypropyl and sec-butyl.

The dyestuff mixtures of the invention can be obtained by simply mixing the various components together in the required proportions. Since, however, the said mixtures are to be used for dyeing aromatic polyester textile materials from aqueous dyebaths the mixtures generally contain in addition one or more of the dispersing agents which are conventionally employed in preparing commercially available forms of disperse dyestuffs, and such mixtures form a further feature of the present invention. Such mixtures can be obtained by milling or grinding together the various dyestuff components in the stated proportions in the presence of one or more dispersing agents and, if desired, in the presence of water and subsequently removing the water from the resulting dispersion and/or standardising the mixture by the addition of conventional diluents such as dispersing agents, de-dusting agents and/or water-soluble organic liquids.

The dyestuffs of Formula I can themselves be obtained, for example, by the condensation of a mixture of quinizarin and leucoquinizarin with an arylamine of the formula $R-NH_2$, wherein R has the meaning stated above, in the presence of boric acid and a liquid such as water and/or water-miscible organic liquid. Whilst the initial condensation product (i.e., Formula I) is obtained, some bis-condensation usually occurs so that the product comprises a mixture of the dyestuffs of Formulae I and II. However, the reaction is carried out under such conditions that the formation of the dyestuff of Formula II is kept to a minimum and in no event exceeds 30 percent, and in fact is preferably less than 20 percent, by weight of the dyestuff of Formula I.

The dyestuffs of Formula III can be obtained by condensing a mixture of quinizarin and leucoquinizarin with one or two different aliphatic amines of the formula $XNH_2$, wherein X has the meaning stated above, the reaction being carried out in water and/or a water soluble organic liquid, and optionally in the presence of boric acid. When a mixture of two such amines is used then the resulting product is a mixture of the two symmetrical dyestuffs and the unsymmetrical dyestuff.

The yellow to red disperse dyestuffs which can be present in the dyestuff mixtures of the invention can be any of the yellow to red disperse dyestuffs which are conventionally employed in dyeing aromatic polyester textile materials. Such dyestuffs are described in, for example, the third edition of the Colour Index which was published by The Society of Dyers and Colourists in 1971 or in British Specifications Nos. 1256093, 1256355 and 1256714.

The dyestuff mixtures of the invention can be applied to aromatic polyester textile materials by dyeing, padding or printing processes using the methods which are conventionally employed in colouring such textile materials. The said textile materials can be in the form of fibres or filaments or woven or knitted goods. The said textile materials are preferably polyethylene terephthalate textile materials.

The dyestuff mixtures have excellent affinity and build-up properties on aromatic polyester textile materials yielding navy to black shades which have good fastness to light and to wet and to dry heat treatments.

Although the components (b) are known to give bright greenish-blue shades on aromatic polyester textile materials such components are not of technical interest as they have very poor light fastness properties. Surprisingly, whilst the use of mixtures of components (a) and (b), as described above, enables heavy depths of shade to be readily obtained, the presence of the component (b) has little or no deleterious effect on the light fastness of component (a), so that the resulting dyeings have good light fastness properties.

The invention is illustrated but not limited by the following Examples in which the parts and percentages are by weight:

EXAMPLE 1

4 Parts of a mixture of 1-hydroxy-4-anilinoanthraquinone and 1:4-dianilinoanthraquinone in the ratio of 85:15 and 1 part of 1:4-di (isopropylamino)anthraquinone are intimately mixed together.

When dispersed in aqueous medium the above mixture dyes aromatic polyester textile materials in navy shades having a light fastness of 6 (on the standard 1 to 8 scale).

The mixture of 1-hydroxy-4-anilinoanthraquinone and 1:4-dianilinoanthraquinone used in the above Example was itself obtained by heating a mixture of 81 parts of quinizarin, 27 parts of leucoquinizarin, 378 parts of ethanol, 126 parts of water, 54 parts of boric acid and 63 parts of aniline for 12 hours at the boil. 36 Parts of sodium hydroxide and 18 parts of sodium m-nitrobenzenesulphonate were added and the mixture heated at the boil for a further hour. The mixture was cooled and the solid filtered off, washed with water and dried.

EXAMPLE 2

7 Parts of the mixture of 1-hydroxy-4-anilinoanthraquinone and 1:4-dianilinoanthraquinone used in Example 1 and 3 parts of 1-methylamino-4-(β-hydroxyethylamino)anthraquinone containing in total up to 30 percent of 1:4-di(methylamino)anthraquinone and 1:4-di (β-hydroxyethylamino)anthraquinone are intimately mixed together.

When dispersed in aqueous medium the above mixture dyes aromatic polyester textile materials in navy shades having a light fastness of 6.

The 1-methylamino-4-(β-hydroxyethylamino)anthraquinone used in the above Example was itself obtained by heating a mixture of 10 parts of quinizarin, 5 parts of leucoquinizarin, 5.9 parts of a 40 percent aqueous solution of methylamine, 5.9 parts of ethanolamine, 0.5 parts of piperidine and 44 parts of ethanol for 6 hours at the boil. 2.7 Parts of sodium m-nitrobenzenesulphonate were added and this mixture heated for a further 5 hours at the boil. The mixture was cooled and the solid filtered off, washed with water and dried.

EXAMPLE 3

In place of the 1 part of 1:4-di(isopropylamino)anthraquinone used in Example 1 there is used 1 part of 1:4-di(isobutylamino)anthraquinone or of 1:4-di(sec-butylamino)anthraquinone or of 1:4-(γ-methoxypropylamino)anthraquinone when similar mixtures are obtained.

EXAMPLE 4

4 Parts of a mixture of 1-hydroxy-4-(p-β-hydroxyethoxy-anilino)anthraquinone and 1:4-di(p-β-hydroxyethoxyanilino)anthraquinone in the ratio of 85:15 and 1 part of 1-methylamino-4-(β-hydroxyethylamino)anthraquinone containing minor amounts of 1:4-dimethylamino anthraquinone and 1:4-di(β-hydroxyethylamino)anthraquinone are intimately mixed together.

When dispersed in aqueous medium the above mixture dyes aromatic polyester textile materials in navy shades having a light fastness of 6 and good heat fastness properties.

The mixture of 1-hydroxy-4-(p-β-hydroxyethoxyanilino)anthraquinone and 1:4-di(p-β-hydroxy ethoxyanilino)anthraquinone used in the above Example was itself obtained by the method described in Example 1 except that 4-β-hydroxyethoxyaniline was used in place of aniline.

EXAMPLE 5

4 Parts of the mixture of 1-hydroxy-4-anilinoanthraquinone and 1:4-dianilinoanthraquinone used in Example 1 and 1 part of 1:4-di(isopropylamino)anthraquinone are milled in the presence of water and 5 parts of the disodium salt of bis(2-sulphonaphth-1-yl) methane. A further 4.6 parts of this disodium salt is added followed by 5 parts of the sodium salt of a lignin sulphonic acid (which is commercially available as Reax 85A) and 0.4 part of the sodium salt of a diisopropylnaphthalene-2-sulphonic acid. After being thoroughly mixed the mixture is dried at 70°C to give 20 parts of a dyestuff composition which readily dispersed disperses added to water.

EXAMPLE 6

23 parts of the mixture of 1-hydroxy-4-anilinoanthraquinone and 1:4-dianilinoanthraquinone used in Example 1, 5.7 parts of the 1-methylamino-4-(β-hydroxyethylamino) anthraquinone used in Example 2, and 1.3 parts of 1-phenyl-3-cyano-4-methyl-5-(p-chlorophenylazo)-6-hydroxypyrid-2-one (the dyestuff of Example 4 of British Specification No. 1256093) are milled together in the presence of water containing 45 parts of the disodium salt of bis(2-sulphonaphth-1-yl) methane and 25 parts of the sodium salt of a lignin sulphonic acid. The mixture is then dried at 70°C to give a dyestuff composition which readily disperses when added to water.

When applied to aromatic polyester textile materials from an aqueous dyebath, this dyestuff composition gives strong navy shades having a light fastness rating of 6.

EXAMPLE 7

A mixture of 8 parts of the dyestuff mixture obtained as described in Example 4 above, 0.5 part of the dyestuff of Example 4 of British Specification No. 1256093 and 0.5 part of 4-nitro-4'-anilinoazobenzene is milled in water containing 10 parts of the disodium salt of bis(2-sulphonaphth-1-yl) methane. A further 4.6 parts of this disodium salt, 5 parts of the sodium salt of a lignin sulphonic acid and 0.4 part of the sodium salt of a diisopropylnaphthalene-2-sulphonic acid are then thoroughly mixed in, and the resulting mixture is dried at 70°C. The resulting dyestuff composition readily disperses in water, and when applied to an aromatic polyester textile material from an aqueous dyebath gives black shades.

EXAMPLE 8

In place of the 7 parts of the mixture of 1-hydroxy-4-anilinoanthraquinone and 1:4-dianilinoanthraquinone used in Example 2 there are used 7 parts of each of the products which are obtained by reacting a mixture of quinizarin and leucoquinizarin with the following arylamines using the conditions specified in the last paragraph of Example 1 except that the 63 parts of aniline are replaced by the equivalent amounts of the arylamines listed and the reaction is carried out for such a time (usually 4 to 18 hours) that the amount of dicondensate is less than 30 percent by weight:

4-aminophenol
3-chloroaniline
4-bromoaniline
4-phenylenediamine
2-,3- or 4-toluidine
4-anisidine
4-phenetidine
4-(β-hydroxyethoxy) aniline
4-(β-hydroxyethyl) aniline
Methyl 4-aminobenzoate
4-n-butylaniline In each case dyestuff compositions are obtained which, when applied to an aromatic polyester textile material from an aqueous dyebath give navy shades of good light fastness properties.

EXAMPLE 9

In place of the 1 part of 1:4-di(isopropylamino)anthraquinone used in Example 1, there is used 1 part of a. 1:4-di(β-hydroxyethylamino)anthraquinone
b. 1:4-di(γ-methoxypropylamino) anthraquinone, or
c. 1:4-di(sec-butylamino) anthraquinone, when similar dyestuff compositions are obtained.

We claim

1. A disperse dyestuff composition which comprises
a. from 65 to 95 percent by weight (based on the total weight of dyestuffs in the mixture) of a disperse anthraquinone dyestuff of the formula

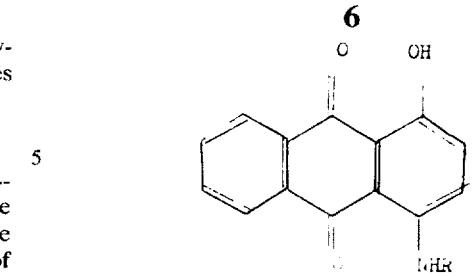

which can contain up to 30 percent of its own weight of a disperse anthraquinone dyestuff of the formula

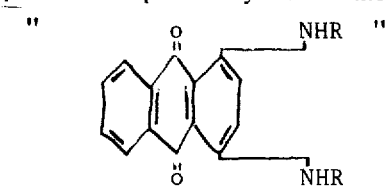

wherein R represents a phenyl radical which can be substituted by one or more chlorine or bromine atoms or by hydroxy, amino, lower alkyl, lower alkoxy, hydroxyloweralkoxy, N-lower alkylamino, N:N-di(lower alkyl) amino, carbo lower alkoxy, lower alkoxycarbonyloxy or lower alkylcarbonyloxy groups;

b. from 5 to 35 percent by weight (based on the total weight of dyestuffs present in the mixture) of one or more disperse anthraquinone dyestuffs of the formula:

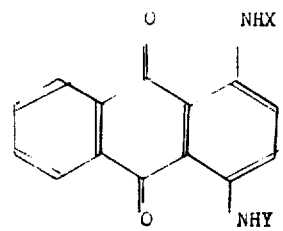

wherein X and Y each independently represent a lower alkyl, hydroxy lower alkyl or lower alkoxy lower alkyl radical.

2. A dyestuff composition as claimed in claim 1 which additionally includes a dispersing agent.

* * * * *